(12) United States Patent
Watanabe et al.

(10) Patent No.: US 9,002,695 B2
(45) Date of Patent: Apr. 7, 2015

(54) MACHINE TRANSLATION DEVICE, METHOD OF PROCESSING DATA, AND PROGRAM

(75) Inventors: Hideo Watanabe, Tokyo (JP); Hiroshi Kanayama, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 2733 days.

(21) Appl. No.: 10/843,748

(22) Filed: May 12, 2004

(65) Prior Publication Data
US 2005/0010421 A1    Jan. 13, 2005

(30) Foreign Application Priority Data

May 12, 2003 (JP) ................................ 2003-133537
May 12, 2003 (JP) ................................ 2003-156042

(51) Int. Cl.
*G06F 17/28* (2006.01)
*G06F 17/20* (2006.01)
*G06F 17/24* (2006.01)

(52) U.S. Cl.
CPC .......... *G06F 17/2872* (2013.01); *G06F 17/241* (2013.01)

(58) Field of Classification Search
USPC ................. 704/1, 2, 3, 8, 9, 10, 277
See application file for complete search history.

(56) References Cited

U.S. PATENT DOCUMENTS

| 4,635,199 A * | 1/1987 | Muraki | 704/2 |
|---|---|---|---|
| 4,864,503 A * | 9/1989 | Tolin | 704/2 |
| 5,490,061 A * | 2/1996 | Tolin et al. | 704/2 |
| 5,675,815 A * | 10/1997 | Yamauchi et al. | 715/236 |
| 5,826,219 A * | 10/1998 | Kutsumi | 704/4 |
| 5,987,401 A * | 11/1999 | Trudeau | 704/2 |
| 6,092,035 A * | 7/2000 | Kurachi et al. | 704/3 |
| 6,275,789 B1 * | 8/2001 | Moser et al. | 704/7 |
| 6,470,306 B1 * | 10/2002 | Pringle et al. | 704/3 |
| 6,993,472 B2 * | 1/2006 | Redpath | 704/2 |
| 7,441,184 B2 * | 10/2008 | Frerebeau et al. | 715/234 |
| 8,234,106 B2 * | 7/2012 | Marcu et al. | 704/2 |
| 2001/0029443 A1 * | 10/2001 | Miyahira | 704/7 |

(Continued)

FOREIGN PATENT DOCUMENTS

| JP | 2003-058481 | 2/2003 |
|---|---|---|
| WO | WO01/039034 | 5/2001 |

OTHER PUBLICATIONS

Kanayama et al, "Multilingual Translation via Annotated Hub Language", Sep. 2003, MT Summit IX, pp. 202-207.*

(Continued)

*Primary Examiner* — Olujimi Adesanya
(74) *Attorney, Agent, or Firm* — Anne Vachon Dougherty

(57) ABSTRACT

Provided are two types of translation engines. One of the translation engines translates a text written in a source language X into an intermediate language C, and the other translates the intermediate language C into a target language Y. The X-C translation engine translates an original text written in the source language X into a text in a predetermined intermediate language C as well as acquires and adds annotations obtained by this translation to the translated text written in the intermediate language C. The C-Y translation engine references annotations, which are obtained by the X-C translation engine and added to the text in the intermediate language C, and translates the text in the intermediate language into a text in the target language Y sentence.

15 Claims, 11 Drawing Sheets

(56) References Cited

U.S. PATENT DOCUMENTS

2002/0173946 A1* 11/2002 Christy ............................. 704/2
2003/0028366 A1* 2/2003 Redpath ........................... 704/3
2005/0055217 A1* 3/2005 Sumita et al. ................. 704/277

OTHER PUBLICATIONS

Hajic et al, "Machine Translation of Very Close Languages", 2000, ANLP-NAACL proceedings of 6th conference, pp. 7-12.*
Reifler, "The First Conference on Mechanical Translation", Aug. 1954, mechanical Translation 1, pp. 23-32.*
Qi et al, An Interlingua-Based Chinese-English MT System, Jul. 2002, J. Computer Sci. and Technology, vol. 17, No. 4, pp. 464-472.*
Gollins et al, "Improving Cross Language Retrieval with Triangulated Translation", Sep. 2001, Proc. of the 24$^{th}$ Annual International ACM SIGIR conf. on Research and Development in Information Retrieval, pp. 1-6.*
Kraaij et al, "Embedding Web-Based Statistical Translation Models in Cross-Language Information Retrieval", 2003, ACM, vol. 29, pp. 381-419.*
Lonsdale, et al, "Large-Scale Machine Translation:An Interlinqua Approach", Proceedingts of IEA/AIE, 1994.
Tomita, et al, "Another Stride Towards Knowledge-Based Machine Translation", pp. 633-638, Proceedings of 11th Conf. on Computational Linquistics, 1986.
Watanabe, et al, "An Annotation System for Enhancing Quality of Natural Language Processing", Coling, 2002.

* cited by examiner

FIG. 2

| ENGLISH | JAPANESE-FRENCH |
|---|---|
| bank | GINKO —banque, TEIBO —digue |
| free | JIYUNA —libre, MURYONO —gratuit(e) |
| spring | HARU —printemps, BANE —ressort |
| capital | SHIHON —capital, SHUTO —capitale |
| major | SHOUSA—commandant, SENKOUKAMOKU —specialite |
| board | TORISHIMARIYAKUKAI-counseil, ITA-planche |

FIG. 3

ENGLISH SENTENSE : She saw a man with a telescope.

<lal:s><lal:w id="1" lex="she" pos="pron">She</lal:w>
<lal:w id="2" lex="see" pos="verb">saw</lal:w>
<lal:w>a</lal:w> <lal:w id="4">man</lal:w> <lal:w id="5" mod="2">with</lal:w>
<lal:w>a</lal:w> <lal:w>telescope</lal:w>.</lal:s>

FIG. 4

ENGLISH SENTENSE : She saw a man with a telescope.

<lal:s><lal:w id="1" lex="she" pos="pron">She</lal:w>
<lal:w id="2" lex="see" pos="verb">saw</lal:w>
<lal:w>a</lal:w> <lal:w id="4">man</lal:w> <lal:w id="5" mod="i1:2 i2:4">with</lal:w>
<lal:w>a</lal:w> <lal:w>telescope</lal:w> </lal:s>

```
<lal:w><lal:orig lang="ja" lex="ペン"/>pen</lal:w>

<lal:seg><lal:orig lang="ja" lex="国土交通省"/>Ministry of Land, Infrastracure and Transport</lal:seg>
```

FIG. 6

GERMAN SENTENSE (D21) Wie geht es dir?
(D22) Wie geht es Ihnen?

ENGLISH SENTENSE (E1) <lal:s><lal:orig lang="de"/>How are you?</lal:s>
(E2) <lal:s><lal:orig lang="de" für="polite"/>How are you?</lal:s>

MACHINE TRANSLATION DEVICE, METHOD OF PROCESSING DATA, AND PROGRAM

FIELD OF THE INVENTION

The present invention relates to machine translation, and more particularly, to a machine translation system which translates a predetermined source language into an intermediate language temporarily, then into a target language.

BACKGROUND OF THE INVENTION

Machine translation today has been increasingly used in line with the improvement in the performance of translation engines. This machine translation analyzes syntax and semantics of a text in a predetermined natural source language by using a computer and substitutes the text for a text in another natural language. A wide range of languages has been handled in machine translation. Thereupon, a system has been proposed to achieve multilingual translation which enables translation for not only a predetermined pair of languages, but also arbitrary languages.

In multilingual translation, it is inefficient to construct independent translation engines for all language pairs since the construction requires an enormous load upon development. Thus, there is a method of translating an original text into a predetermined intermediate language temporarily, then into a desired language.

Conventionally, there are two modes for this type of multilingual translation system.
Mode 1 A pure natural language (e.g., English) is set as an intermediate language (e.g., refer to Patent Document 1).
Mode 2 Pivot—in which translation is performed using a semantic abstract data structure without depending on a language (e.g., refer to Non-Patent Documents 1 and 2).

Mode 1 achieves automatic translation between arbitrary languages (language X to language Y) by linking two translation engines. One is an X-C translation engine for translating the language X into a natural language, the intermediate language (hereinafter, referred to as language C), and the other is a C-Y translation engine for translating the language C into the language Y.

Instead of a natural language serving as an intermediate language in Mode 1, Mode 2 employs a data structure which does not depend on a specific language. Specifically, semantics and abstracts are extracted from a text in the language X to be expressed by the data structure, and a text in the language Y is constructed based on the data structure.

Japanese Patent Unexamined Publication No. 2003-58481 (P. 5); Masaru Tomita, Jaime G. Carbonell, "Another Stride Towards Knowledge-Based Machine Translation," COLING 1986: p. 633-638; Deryle W. Lonsdale, Alexander M. Franz, John R. R. Leavitt, "Large-scale Machine Translation: An Interlingua Approach," Seventh International Conference on Industrial and Engineering Applications of Artificial Intelligence and Expert Systems, p. 525-530, Austin, Tex.: 1994; Hideo Watanabe, Katashi Nagao, Michael C. McCord, Arendse Bernth, "Improving Natural Language Processing by Linguistic Document Annotation," In Processings of Workshop of the 18th International Conference on Computational Linguistics, COLING 2000 all discuss translation technology.

As previously mentioned, a multilingual translation system has been conventionally proposed. In the foregoing translation system employing an intermediate language, Mode 1 which employs a natural language as the intermediate language has the following problems in data missing:

(1) Different expressions in the source (translation source) language X may be translated into one expression in the intermediate language C. In this case, when the intermediate language C is translated into the target (translation destination) language Y, the outputted language Y and the language C have the same expression. Thus, the difference between the expressions in the language X cannot be reflected in the target language Y.

(2) In the case where there are several ways of translating a certain expression in the source language X into the intermediate language C, accurate translation in the target language Y may not be generated if the expression is determinately translated in one of the ways.

These circumstances (1) and (2) are problems caused when a language selected as an intermediate language cannot retain sufficient data required for translating into a target language.

Meanwhile, in Mode 2 which does not employ a natural language as an intermediate language, a data structure can be constructed to retain missing data in Mode 1. However, in reality, it is extremely hard to design and implement a data structure for an intermediate language to meet various language characteristics in a wide range. Accordingly, the coverage of the translation system is very small in practice.

SUMMARY OF THE INVENTION

In consideration of the foregoing problems, an object of the present invention is to achieve highly accurate multilingual machine translation by preventing data from missing upon translation.

Moreover, another object of the present invention is to provide a translation system, which achieves highly accurate machine translation by employing a predetermined natural language as an intermediate language, and a method thereof.

The present invention achieving the foregoing objects is realized as a machine translation device configured as follows: this machine translation device comprises two types of translation engines. The first translation engine translates an original text written in a source language into a text in a predetermined intermediate language as well as acquires and adds annotations obtained by this translation to the text in the intermediate language. The second translation engine references the annotations, which are added to the text in the intermediate language and obtained by the first translation engine, and translates the text in the intermediate language into a text in a target language.

Herein, it is possible to provide the pluralities of first and second translation engines to correspond to the pluralities of source languages and target languages, respectively. This enables translations between multiple arbitrary languages, to which the first and second translation engines correspond.

More particularly, the second translation engine translates by using dictionaries for the source language to the target language based on the annotations, in addition to the intermediate language to the target language. Furthermore, the second translation engine outputs both translations, one being for source to target language based on a source annotation and one being for intermediate to target language, as translation results. The second translation engine may also output both an annotation translation which is based on the addition, non-source language annotations, which include word source annotation data, word modification annotation data, sentence scope annotation data, alternative interpretation annotation data and linguistic attribute annotation data, and a non-annotation translation which is not based on the non-source language annotations. Further, the second translation engine may provide alternative translations based on alternative interpretation annotation data. The first translation engine writes the text in the intermediate language and the annotations in a document file of a predetermined markup language. The annotations are written as commands for the markup language.

The machine translation device of the present invention may further comprise a translation result modification unit that outputs the translation results of the second translation engine, and accepts as well as reflects the processing by the user in the translation results.

Another machine translation device of the present invention comprises a parse unit, a syntactic transfer unit and a text generation unit to translate a text written in a first language into a text in a second language. The parse unit parses the text written in the first language. The syntactic transfer unit translates the syntax of the text written in the first language into syntax of the second language by using a dictionary from a third language to the second language based on annotations added to the text written in the first language, in addition to a dictionary for the first language to the second language. The text generation unit generates the text in the second language based on the results of processings by the syntactic transfer unit.

Another invention achieving the foregoing objects is realized as the following method of data processing, which translates an original text written in a source language into a text in a target language by using a computer. The method of data processing comprises first and second steps. In the first step, the original text is translated into a text in a predetermined intermediate language, annotations obtained by this translation are acquired to be added to the translated text in the intermediate language, and the text in the intermediate language is stored in predetermined storage means. In the second step, the text in the intermediate language stored in the storing means is translated into the text into the target language by referencing annotations added to the text in the intermediate language and outputted.

Furthermore, the present invention can be realized as a program which controls a computer to function as the aforementioned machine translation device or a program which causes a computer to execute processings corresponding to each step in the foregoing method of processing data. These programs can be provided by a magnetic disk, an optical disc, a semiconductor memory, and other recording medium storing the programs or via a network.

BRIEF DESCRIPTION OF THE DRAWINGS

For a more complete understanding of the present invention and the advantages thereof, reference is now made to the following description taken in conjunction with the accompanying drawings.

FIG. 2 is a diagram showing examples where several Japanese and French words correspond to one English word.

FIG. 3 is a diagram showing an example where annotations are added to English sentence "She saw a man with a telescope" by LAL used in the present invention.

FIG. 4 is a diagram showing an example wherein a plurality of interpretation data are added to the English sentence in FIG. 3 by LAL.

FIG. 6 is a diagram showing an example of LAL in the case where German sentences are translated into English, the intermediate language.

DETAILED DESCRIPTION OF THE PREFERRED EMBODIMENTS

The invention will be detailed below with reference to the accompanying drawings.

Figure 1:
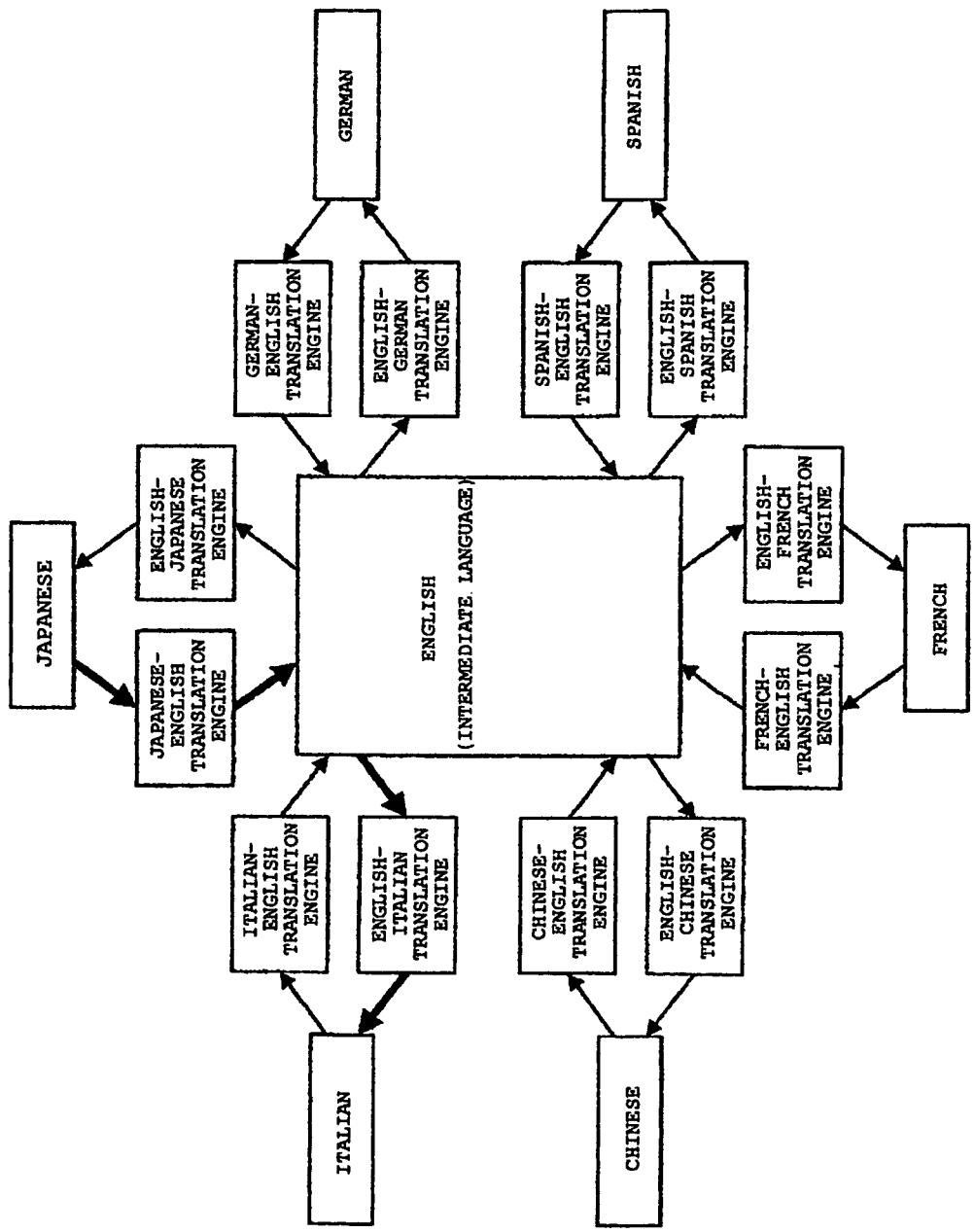
FIG. 1 is a diagram showing the entire configuration of a multilingual translation system realized by the present invention.

FIG. 1 is a diagram showing the entire configuration of a multilingual translation system realized by the present embodiment. The multilingual system shown in FIG. 1 translates a desired language into another through an intermediate language. A predetermined natural language is employed as an intermediate language. In the present embodiment, English is used as the intermediate language since English already has translation engines for numerous languages. In other words, when the multilingual translation system in FIG. 1 translates Japanese into Italian, a Japanese-English translation engine translates Japanese into English temporarily. Thereafter, an English-Italian translation engine translates English into Italian (see: the bold arrows in FIG. 1). This process is the same for translation of all the languages (in the example shown by the drawing, Japanese, Italian, Chinese, French, Spanish and German) supported by the multilingual translation system in the present embodiment. Note that English is thus employed as the intermediate language in the present embodiment. However, it is obvious that other languages can also be used as an intermediate language.

In the case where an arbitrary language is translated into another merely through an intermediate language in the system shown in FIG. 1, when a source language X is translated into an intermediate language C, data obtained by this translation processing is lost (including data based on a text in the source language X). Thus, the accuracy of translation in a target language Y, which is finally generated, is reduced. This is described with specific examples.

Suppose Japanese is translated into French, setting English as the intermediate language C. For instance, Japanese sentences "Watashi wa ginko e ikimashita" (J11) and
"Watashi wa teibo e ikimashita" (J12)
are translated into English. Both outcomes will be
"I went to a bank."

This is because English words for Japanese "ginko" (place for money) and "teibo" (side of waterway) are both "bank." When this English sentence is translated into French, an example outcome will be
"Je suis alle a une banque" (F11)
(accents are omitted herein).

French word "banque" has the same meaning as "ginko," but not "teibo." Thus, if the French sentence (F11) is a result of translating the Japanese sentence (J12) as an original text (a source), the French text (F11) is an apparent mistranslation (depending on translation engines, French word "digue" (side of waterway) may be selected for English word "bank." In this case, if the French sentence was the result of the Japanese sentence (J11), the sentence would be a mistranslation.

FIG. 2 is a diagram showing examples where several Japanese and French words correspond to one English word, similar to the above "bank," "ginko," "teibo," "banque," and "digue."

When a text including words shown in FIG. 2 or the like is translated, data on the word used in the source language X is lost upon translation into English, the intermediate language C. Accordingly, this possibly leads to mistranslation.

Missing a nuance such as politeness is another example of data missing caused by the intermediate language C. For example, compare German sentences
"Wie geht es dir?" (D21) with
"Wie geht es Ihnen?" (D22).
Although these two sentences have the same meaning, the sentence (D22) is more polite. It is similar to Japanese sentences
"Genkikai?" (J21) and
"Ogenkidesuka?" (J22),
where there is a difference in nuance. However, English does not have phrases with the same meaning and different levels of politeness as these sentences. Accordingly, when these German and Japanese sentences are translated into English, the outcome will be
"How are you?" (E21).
Thus, it is impossible to distinguish the sentences. As a consequence, it is impossible to accurately translate the German sentences (D21) and (D22) into Japanese sentences (J21) and (J22), respectively, because data on nuance is lost upon translation into English.

The above examples illustrate problems in the case where English is used as the intermediate language C. In contrast, there are cases where several English words correspond to one Japanese word or one French word upon translation into English, and where Japanese and German have one phrase for different texts with the same meaning and different nuance in English. These disadvantages are generally seen in multilingual translation with the intermediate language C. Even if another language is employed as the intermediate language C, the disadvantages will not be eliminated.

As described above, there is a disadvantage that different expressions in the source language X and the target language Y are translated into one expression in the intermediate language C. The following is another disadvantage of merely using the intermediate language C.

In the X-C translation, the source language X is successfully parsed, and the accurate intermediate language C is outputted. Nevertheless, there is a case where an error occurs when the intermediate language C is parsed. It is difficult to parse the intermediate language C in C-Y translation, especially when a proper noun, which is known in the source language X and unknown in the intermediate language C, or the like is included.

Moreover, suppose the case in which a plurality of translation options are presented as translation results to enable a user to select a proper translation in the target language Y or modify the translation. The expression in the source language X is determinately translated into one expression in the intermediate language C. In this case, the desired translation of the user is not possibly included in the translation options of the translated target language Y.

To prevent the foregoing quality degradation of translation caused by data missing upon the X-C translation, the data obtained by the translation processing upon the X-C translation is added to the translated text in the intermediate language C as annotations. These annotations are utilized in the C-Y translation. For example, the annotations include the following data that can be acquired in the translation processing:

Scope of a word and the data thereof (basic form, part of speech and other attributes)
Modification data on words
Scope of a sentence
Alternative interpretation data (words and the entire sentence)
Data on source language Herein, the scope of a word is data indicating the scope of one word. For example, when a compound word, a proper noun or the like that is extremely segmented is to be translated, mistranslation is likely. In this case, the data can designate the proper scope of the word. The scope of a sentence is used in a case such as the following: For instance, a period in English is used to end a sentence as well as to indicate abbreviations (e.g., Mr.). Thus, it is hard to know whether the sentence is ended merely based on a period in a sentence. In this case, the data can designate the proper scope of one sentence. Furthermore, alternative interpretation data presents options when a plurality of equivalent words and sentences exist upon translation.

A method of adding the annotations to the text in the intermediate language C can be varied and is not particularly limited. However, in the present embodiment, a description is given of a method of writing the text in the intermediate language C as an XML document and adding annotations to the text by XML-based LAL (Linguistic Annotation Language) (e.g., refer to Non-Patent Document 3 for LAL).

FIG. 3 is a diagram showing an example where annotations are added to English sentence "She saw a man with a telescope" by LAL.

In the example of LAL shown in FIG. 3, tags <lal:s> and <lal:w> indicate scopes of a sentence and words, respectively. "lex" and "pos" indicate a basic form and a part of speech respectively as attributes of <lal:w>. As for modification relationship between words, the ID of the word is indicated by an id attribute of <lal:w>, and an id value of the modified word is designated as a value of a mod attribute. In the foregoing example, word "with" having id="5" modifies word "saw" having id="2." If such modification data can be referenced, it will not be determinately defined as to whether the prepositional phrase "with a telescope" modifies "man" or "saw." Thus, it is possible to reconstruct the structure, which is recognized when the source language X is translated into the intermediate language C in the first step, in the translation from the intermediate language C into the target language Y.

Generally, there are a plurality of words equivalent to one word. Narrowing the selection of equivalent words is one difficulty for machine translation. For example, Japanese word "mondai" can be translated into English words "problem," "issue," "question" or the like. A Japanese-English translation engine usually translates "mondai" into "problem." A state where other word options exist can be written by using LAL as follows:

<lal:w lex="problem" lex#cand="issue, question">problem</lal:w>

Translation results from the source language X into the intermediate language C have a plurality of data on words as described above. Thus, in the translation from the intermediate language C into the target language Y in the second step, it is possible to narrow the selection according to relationships among words and at least present alternative equivalent words as the translation results based on the data.

In addition, there may be a plurality of options for not only words, but also syntax when the text in the intermediate language C is generated from the text in the source language X. For example, in the aforementioned English sentence "She saw a man with a telescope," it is hard to know whether "with" modifies "saw" or "man" from this sentence. In this case, it is preferable to retain a plurality of interpretations (options) of the intermediate language C as data for translation from the intermediate language C into the target language Y. LAL can retain a plurality of interpretations in one annotation by using interpretation ID data as prefix (interpretation specifier) of an attribute value.

FIG. 4 is a diagram showing an example where data on a plurality of interpretations are added to the English sentence in FIG. 3 by LAL.

In the example in FIG. 4, a value of mod attributes indicating the modified destination of word "with" having id="5" is constituted by a plurality of values with interpretation specifiers i1 and i2. The interpretation i1 indicates that "with" modifies "saw," and the interpretation i2 indicates that "with" modifies "man."

In addition, data on the source language X is expressed by using tag <lal:orig>.

Figure 5:
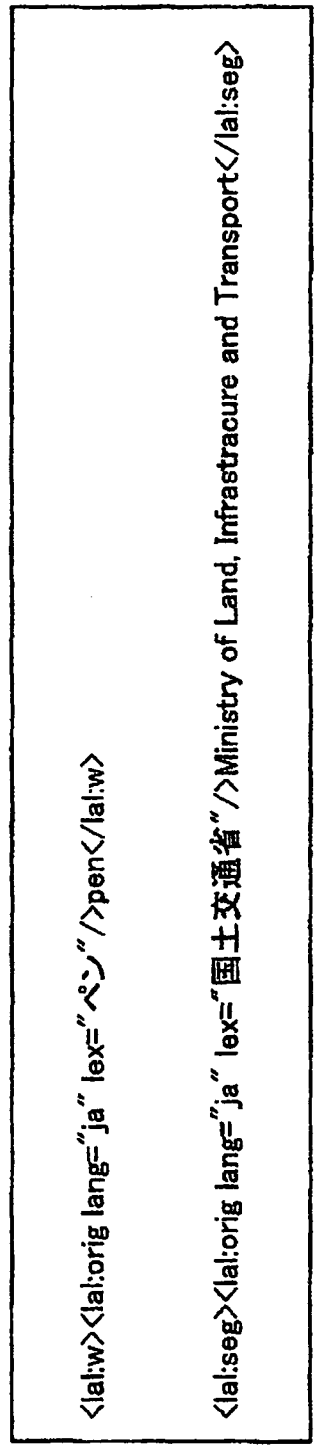
FIG. 5 is a diagram showing an example of LAL in the case where Japanese words "pen" and "kokudokotsusyo" are translated into English, an intermediate language.

FIG. 5 is a diagram showing an example of LAL when Japanese words "pen" and "kokudokotsusho" are translated into English, the intermediate language C.

Basically, tag <lal:orig> can use the same attribute as tag <lal:w>. Note that it is mandatory to designate the source language X in lang.

By adding data, obtained by the processing of the X-C translation, to the text in the intermediate language C, it is possible to reference two bilingual dictionaries when the intermediate language C is translated into the target language Y. One bilingual dictionary is for the intermediate language C and the target language Y (hereinafter, referred to as C-Y bilingual dictionary), and the other is for the source language X and the target language Y (hereinafter, referred to as X-Y bilingual dictionary). At this time, by utilizing the similarity between the aggregations of equivalent words in the target language Y obtained by the C-Y bilingual dictionary and by the X-Y bilingual dictionary, it is possible to produce more accurate translation results than the case where only the C-Y bilingual dictionary is used.

Furthermore, by using LAL, it is possible to define the attribute indicating the data and add the data on nuance such as a level of politeness to the text in the intermediate language C.

FIG. 6 is a diagram showing an example of LAL in the case where the aforementioned German sentences (D21) and (D22) are translated into English, the intermediate language C.

In the example shown in FIG. 6, both translated English sentences (E1) and (E2) are
"How are you?"
However, attribute ftr, a value of which is "polite," is present in the English sentence (E2) translated from the German sentence (D22), but in the English sentence (E1) translated from the German sentence (D21). To translate the intermediate language C into Japanese, target language Y, the presence of attribute ftr value "polite" is referenced. By translating according to the presence, it is possible to reflect the difference in nuance of the German in Japanese.

Hereinbefore, data obtained by the translation processing and added to the text in the intermediate language C and the method of adding the information have been described with the specific examples. However, other than the foregoing XML document and LAL, a variety of methods can be employed. For example, annotations can be created in a different file and made to correspond to the relevant parts in the text in the intermediate language C by using means for designating specific parts in the sentence, such as XPath, instead of directly embedding tags in the text in the intermediate language C by a tag.

Moreover, it is not required to add all the aforementioned data to the relevant parts in the text in the intermediate language C completely. The data may be added to only the significant parts in the sentence. It should not be presumed that all the data are completely added in the translation from the intermediate language C into the target language Y.

Note that the various aforementioned data are examples of data that can be utilized as annotations. The data that can be added to the text in the intermediate language C as annotation are not limited to those. It is possible to use arbitrary data that can be utilized as annotations to improve the accuracy of translation in accordance with types of languages and texts or the like.

Figure 7:
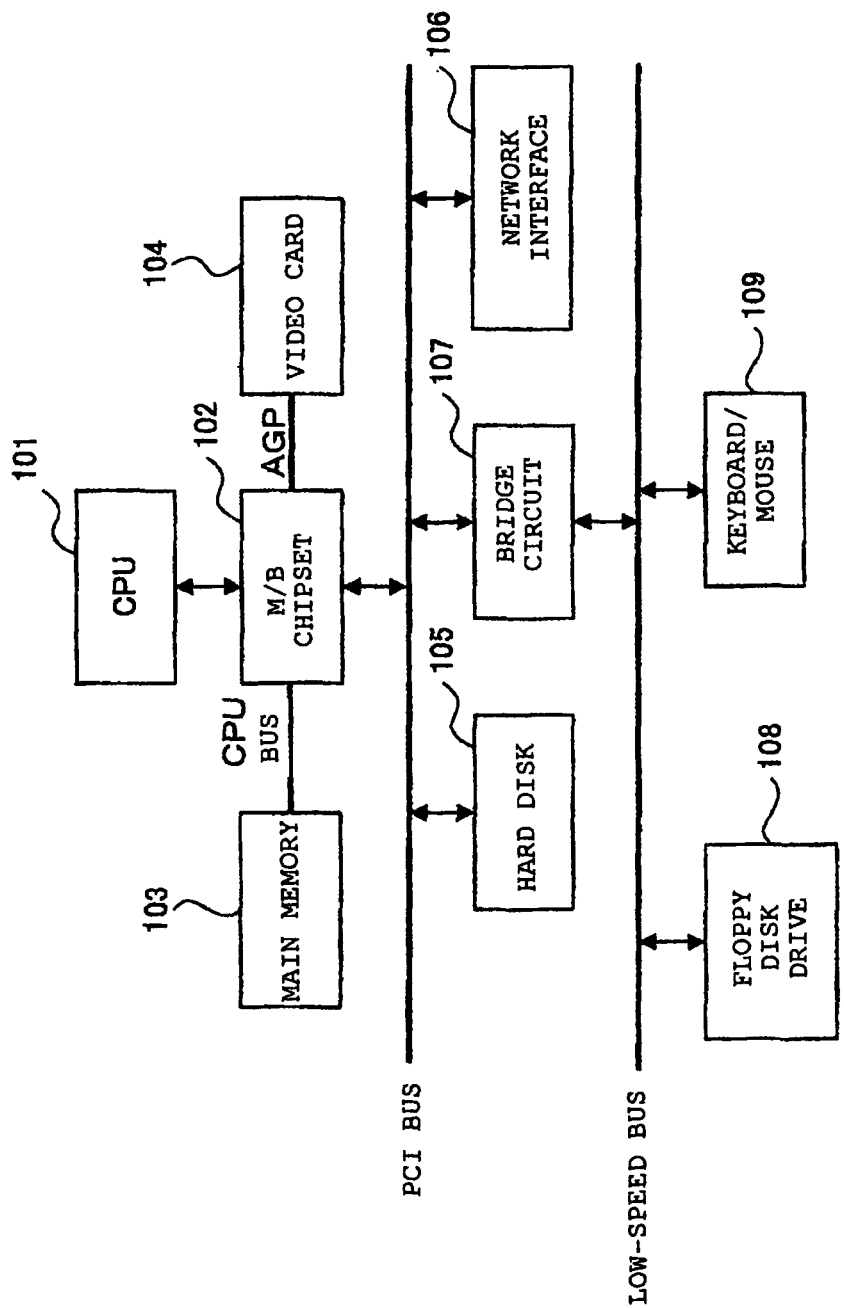
FIG. 7 is a diagram schematically showing an example of the hardware configuration of a computer with a machine translation device according to the present invention.

FIG. 7 is a diagram schematically showing an example of the hardware configuration of a computer achieving the machine translation device by the present embodiment.

A computer shown in FIG. 7 comprises a CPU (Central Processing Unit) 101, a main memory 103, a video card 104, a hard disk 105, a network interface 106, a floppy disk drive 108 and a keyboard/mouse 109. The CPU 101 is operation means. The main memory 103 is connected to the CPU 101 through an M/B (mother board) chipset 102 and a CPU bus. The video card 104 is connected to the CPU 101 through the M/B chip set 102 and AGP (Accelerated Graphics Port). The hard disk 105 is connected to the M/B chipset 102 through a PCI (Peripheral Component Interconnect). The floppy disk drive 108 and the keyboard/mouse 109 are connected to the M/B chip set 102 through the PCI bus, a bridge circuit 107 and a low-speed bus such as ISA (Industry Standard Architecture).

Note that FIG. 7 exemplifies the hardware configuration of the computer achieving the present embodiment. If it is possible to apply the present embodiment, other configurations can be employed. For example, instead of providing the video card 104, only a video memory can be installed, and image data may be processed in the CPU 101. Alternatively, an external memory device such as a CD-R (Compact Disc Recordable) drive or a DVD-RAM (Digital Versatile Disc Random Access Memory) drive may be provided through an interface including ATA (AT Attachment) or SCSI (Small Computer System Interface).

Figure 8:
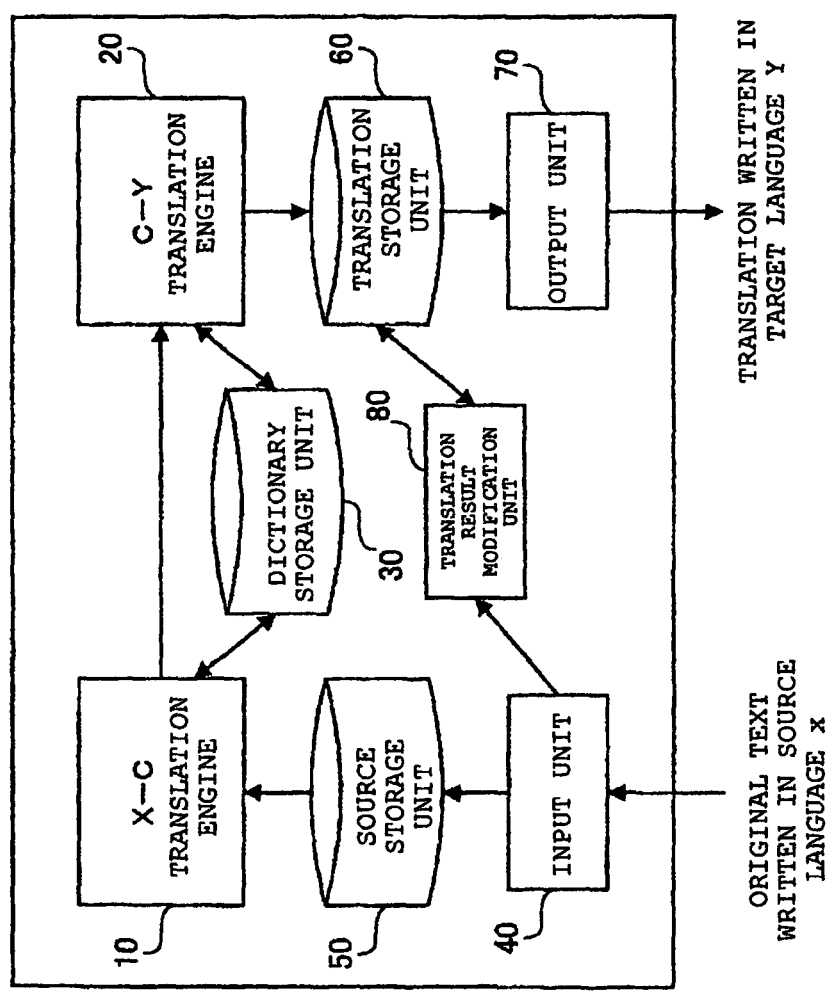
FIG. 8 is a diagram showing the function configuration of the machine translation device according to the present invention.

FIG. 8 is a diagram showing the function configuration of the machine translation device by the present embodiment.

As shown in FIG. 8, the machine translation device of the present embodiment comprises an X-C translation engine 10, a C-Y translation engine 20, a dictionary storage unit 30, an input unit 40, a source storage unit 50, a translation storage unit 60 and an output unit 70. The X-C translation engine 10 translates a text in a source language X (original text) into a text in an intermediate language C. The C-Y translation engine 20 translates the text in the intermediate language C into a text in a target language Y (translation). The dictionary storage unit 30 stores various dictionaries which are referenced in the translation process. The input unit 40 inputs the original text. The source storage unit 50 stores the inputted original text. The translation storage unit 60 stores the translation. The output unit 70 outputs the translation. In addition, the machine translation device further comprises a translation result modification unit 80 for a user to modify the translation manually. This is not a mandatory component.

Among the foregoing components, the X-C translation engine 10, the C-Y translation engine 20, and the translation result modification unit 80 are virtual software blocks achieved by, for example, the CPU 101 in FIG. 7 controlled by a program. The program which controls the CPU 101 can be provided by distributing a magnetic disk, an optical disc, a semiconductor memory and other recording media storing the program or via network.

Moreover, the dictionary storage unit 30, the source storage unit 50 and the translation storage unit 60 are implemented by, for example, the main memory 103 and the hard disk 105 in FIG. 7.

The input unit 40 and the output unit 70 can be achieved by an input device such as a keyboard, and a display or the like, respectively. Alternatively, it is possible to input the original text from an external device via network and output the translation to the external device. In this case, the network interface 106 in FIG. 7 functions as the input and output units 40 and 70.

Figure 9:
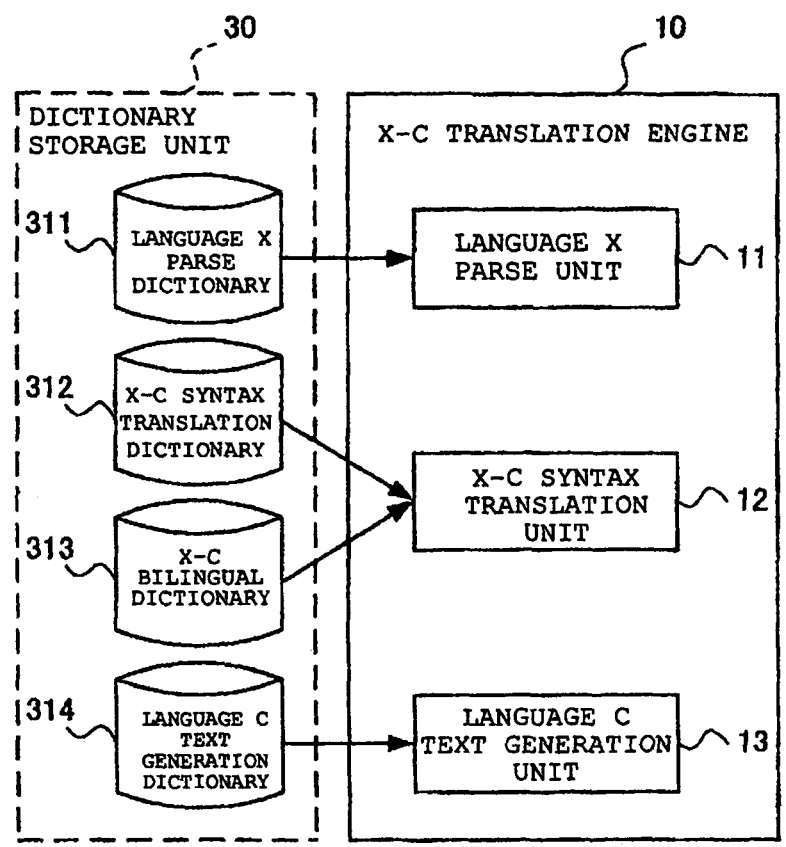
FIG. 9 is a diagram showing the configuration of an X-C translation engine according to the present invention.

FIG. 9 is a diagram showing the configuration of the X-C translation engine.

Referring to FIG. 9, the X-C translation engine 10 comprises a language X parse unit 11, an X-C syntactic transfer unit 12, and a language C text generation unit 13. The language X parse unit 11 parses the text in the source language X. The X-C syntactic transfer unit 12 translates the syntax of the source language X into syntax of the intermediate language C based on the results of parsing. The language C text generation unit 13 generates the text in the intermediate language C based on the results of the syntax translation. In the processings by these functions, various dictionaries (a language X parse dictionary 311, an X-C syntax translation dictionary 312, an X-C bilingual dictionary 313 and a language C text generation dictionary 314) stored in the dictionary storage unit 30 are referenced.

The X-C translation engine 10 inputs the original text in the source language X, which is the translation source, from the source storage unit 50 and starts translating into the intermediate language C in the first step.

First, the language X parse unit 11 parses the syntax structure of the original text by using the language X syntax parse dictionary 311. Accordingly, the syntax structure of the original document can be obtained, including word attributes and modification data. Second, the X-C syntactic transfer unit 12 translates the parsing results into the syntax structure of the intermediate language C by using the X-C syntax translation dictionary 312 and the X-C bilingual dictionary 313. Third, based on the results of the syntax translation, the language C text generation unit 13 generates the text in the intermediate language C by using the language C text generation dictionary 314. Thus, the structure of the intermediate language C is translated into a normal text through processings such as the order and conjugation.

The foregoing processings including parsing, syntax translation and text generation are the same as the processings performed by existing translation engines. In the present embodiment, extracted as annotations are data on word attributes, modification, lexical items and the like included in the syntax structure of processing results by the language X parse unit 11 when the X-C syntactic transfer unit 12 parses and the language C text generation unit 13 generates a text.

Thereafter, the language C text generation unit 13 adds the obtained annotations to the generated text in the intermediate language C. As for a method of adding the annotations, it is possible to attach the annotations to the document file including the text in the intermediate language C as a different file, in addition to embedding the annotations in the text in the intermediate language C by using tag sets such as the aforementioned LAL. Thus, an arbitrary method can be used.

The text in the intermediate language C thus generated, to which the annotations are added, is stored in, for example, the operation area of the main memory 103 as shown in FIG. 7.

Figure 10:
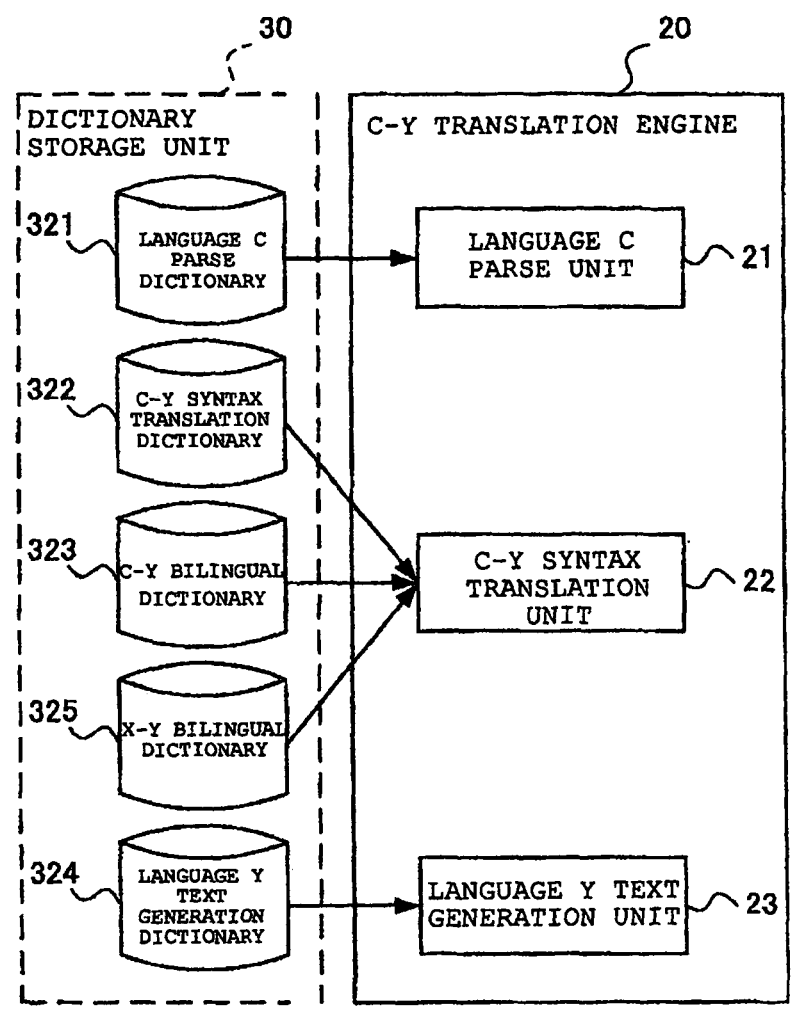
FIG. 10 is a diagram showing the configuration of a C-Y translation engine according to the present invention.

FIG. 10 is a diagram showing the configuration of the C-Y translation engine.

Referring to FIG. 10, the C-Y translation engine 20 comprises a language C parse unit 21, a C-Y syntactic transfer unit 22 and a language Y text generation unit 23. The language C parse unit 21 parses the text in the intermediate language C. The C-Y syntactic transfer unit 22 translates the syntax of the intermediate language C into the syntax of the target language Y based on the parsing results. The language Y text generation unit 23 generates the text in the target language Y based on the results of the syntax translation. In the processings performed by these functions, various dictionaries (a language C parse dictionary 321, a C-Y syntax translation dictionary 322, a C-Y bilingual dictionary 323, a language Y text generation dictionary 324 and an X-Y bilingual dictionary 325) that are stored in the dictionary storage unit 30 are referenced.

The C-Y translation engine 20 reads out the text in the intermediate language C, to which the annotations are added, from the operation area of the main memory 103 or the like, and starts translating into the target language Y in the second step. The processings for translation including parsing, syntax translation and text generation are the same as the processings performed by the existing translation engines. However, in the present embodiment, translation is performed by referencing the annotations as appropriate, which are generated upon the translation by the X-C translation engine 10 in the first step.

First, the language C parse unit 21 parses the syntax structure of the text in the intermediate language C by using the language C parse dictionary 321. At this time, the annotations are referenced. When the syntax structure of the text in the intermediate language C is written in the annotations, the priority is given to either constructing syntax so as not to contradict with the designation of the syntax or the syntax structure designated by the annotations.

Second, the C-Y syntactic transfer unit 22 translates the parsing results into the syntax structure of the target language Y by using the C-Y syntax translation dictionary 322 and the C-Y bilingual dictionary 323. At this time, the annotations are referenced. When there is language data on the source language X, it is possible to execute the processing by using the X-Y bilingual dictionary 325 based on the data. In this case, the most suitable words are selected by taking into the account of data on both equivalent words in the C-Y bilingual dictionary 323 and equivalent words in the X-Y bilingual dictionary 325.

Focusing on the translation processing by the C-Y translation engine 20, the syntax is translated by using a bilingual dictionary for the language X, which is the third language, to the language Y, in addition to a bilingual dictionary for the language C, the translation source, to the language Y, the translation target. Note that the bilingual dictionaries for supported language are necessary to achieve the multilingual translation system in the present embodiment, in addition to bilingual dictionaries for the intermediate language C and the supported languages. Unlike the case where bilingual translation engines are developed, creation of the dictionaries does not require enormous development costs.

In the case where linguistic attributes (e.g., singular, plural and polite) are designated in the annotations, the C-Y syntactic transfer unit 22 translates the syntax structure according to the data.

Ultimately, the language Y text generation unit 23 generates the text in the target language Y by using the language Y text generation dictionary 324 and stores the text in the translation storage unit 60.

The output unit 70 outputs the text in the target language Y stored in the translation storage unit 60 as the translation results. Moreover, in the case where the device comprises the translation result modification unit 80, the user can check and modify the translation results, which are outputted by the output unit 70, as appropriate. In this case, the user utilizes a user interface provided by the translation result modification unit 80 to modify the translation in the target language Y, which is outputted by the output unit 70, as appropriate. When there are a plurality of options for equivalent words and translations in the target language Y, the options can be enumerated for the user to select. The translation result modification unit 80 accepts the modification operation performed by the user and reflects the modifications in the translation results stored in the translation storage unit 60.

Next, application examples of the machine translation device by the present embodiment are explained.

Figure 11:
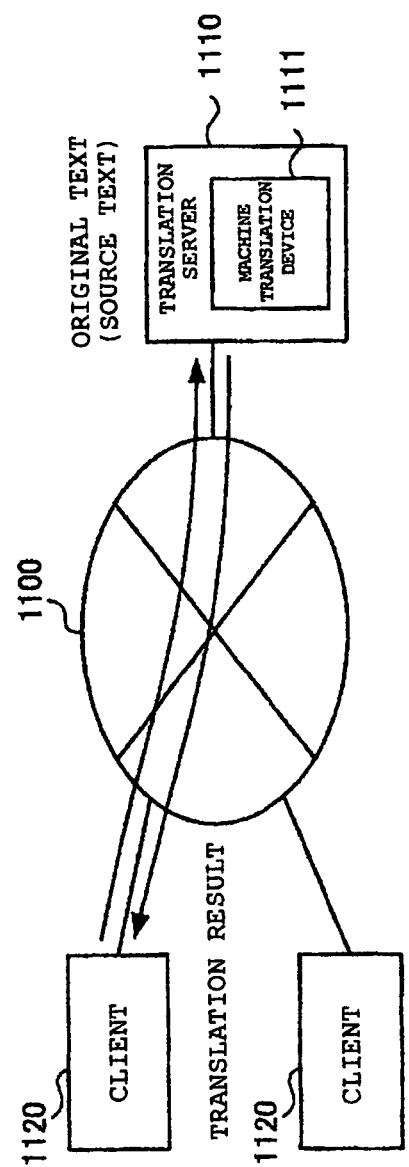
FIG. 11 is a diagram showing a configuration example of the translation system which translates texts according to requests made by clients via network.

FIG. 11 is a diagram showing a configuration example of a translation system, which translates a text according to requests made by clients via a network.

The translation system shown in FIG. 11 is configured by a translation server 1110 and clients 1120. The translation server 1110 is provided on a network 1100 such as the Internet. The clients 1120 access the translation server 1110 via the network 1100.

The translation server 1110 provides services for translation of texts on the network 1100 in response to the external requests. The translation server 1110 is achieved by a personal computer, a work station or other computer. The machine translation device 1111 by the present embodiment is installed to perform these translation functions.

The clients 1120 are computers, PDA (personal digital assistant), mobile phones and other information terminals, which are accessible to the translation server 1110 via the network 1100 and provided with network functions.

When a source text and a translation request are sent from the clients 1120 to the translation server 1110, the translation server 1110 translates the text by the machine translation device 1111 and returns the text, the translation result. As previously mentioned, the machine translation device 1111 by the present embodiment employs two types of translation engines, the X-C translation engine 10 and the C-Y translation engine 20. The machine translation device 1111 translates the source language X into the target language Y by the two-step processing. Accordingly, the machine translation device 1111 comprises the pluralities of X-C translation engines 10 and C-Y translation engines 20 and is configured as the multilingual translation system shown in FIG. 1. Thus, it is possible to translate from an arbitrary language into another, to which one of the X-C translation engines 10 and one of the C-Y translation engines 20 correspond.

Other than the configuration example shown in FIG. 11, it is possible to perform multilingual chat with highly accurate translation in, for example, a chat system which conducts chat via network, via translation server installed with the machine translation device by the present embodiment.

Having thus explained, according to the present invention, it is possible to achieve highly accurate multilingual machine translation, preventing the problem of data being missing upon translation.

Moreover, according to the present invention, it is possible to provide a translation system that achieves the highly accurate machine translation by using a predetermined natural language as an intermediate language, and a method thereof.

Although the preferred embodiments of the present invention have been described in detail, it should be understood that various changes, substitutions, and alternations can be made therein without departing from spirit and scope of the inventions as defined by the appended claims.

What is claimed is:

1. A machine translation device comprising:
   a first translation engine for translating an original text written in a source language into a text in a natural intermediate language, and for acquiring and adding annotations obtained by the translation to the translated text in the intermediate language, said annotations comprising at least a source language annotation; and
   a second translation engine for translating the text in the intermediate language into a text in a target language by referencing the annotations added to the text in the intermediate language; and
   first and second bilingual dictionaries, wherein the second translation engine translates from the intermediate language to the target language using a first dictionary for the source language to the target language based on the source language annotation in addition to a second dictionary for translating from the intermediate language to the target language.

2. The machine translation device according to claim 1, wherein the second translation engine outputs both a translation from the source language to the target language made based on the source language annotation and a translation from the intermediate language to the target language made without using the source language annotation as translation results.

3. The machine translation device according to claim 1, wherein the first translation engine writes the text in the intermediate language in a document file of a predetermined markup language and writes the annotations in the document file as commands for the markup language.

4. The machine translation device according to claim 1, further comprising a translation result modification unit for outputting translation results made by the second translation engine, accepting a user selection processing for the outputted translation results from a user, and reflecting the processing in the translation results.

5. The machine translation device according to claim 1, wherein said first translation engine comprises a plurality of first translation engines which correspond to a plurality of the source languages.

6. The machine translation device according to claim 1, wherein said second translation engine comprises a plurality of second translation engines which correspond to a plurality of the target languages.

7. The machine translation device according to claim 1, wherein the annotations include further annotation data comprising at least one of scope of a word, modification data on words, scope of a sentence, alternative interpretation data, and linguistic attributes.

8. The machine translation device according to claim 1, wherein said first translation engine provides annotations by at least one of designating annotations for parts of a sentence and adding data to selected significant parts of a sentence.

9. The machine translation device according to claim 7, wherein the second translation engine provides a first translation by referencing the further annotation data to produce annotation translation results and provides a second translation without referencing the further annotation data to produce non-annotation translation results, and wherein both translation results are outputted.

10. A machine translation device which translates a text written in a first natural language into a text in a second natural language, the machine translation device comprising:
   a parse unit which parses the text written in the first language;
   a syntactic transfer unit which translates syntax of the text written in the first language into syntax of the second language by using a bilingual dictionary from a third natural language to the second language based on annotations added to the text written in the first language, in addition to a bilingual dictionary for the first language to the second language; and
   a text generation unit which generates the text in the second language based on processing results of the syntactic transfer unit.

11. A computer-implemented method for a computer, having at least computer processing unit and at least one component for outputting of results to a user, to automatically process data to translate an original text written in a source language into a text in a target language, the method comprising the steps of:
   first translating the original text into a first translated text in a predetermined intermediate natural language, acquiring and adding annotations obtained by the translation to the first translated text in the intermediate language, and storing the first translated text in the intermediate language in a predetermined computer storage means, wherein the annotations include at least a source language annotation; and
   second translating the first translated text in the intermediate language stored in the predetermined computer storage means into the second translated text in the target language by referencing the annotations added to the text in the intermediate language, a bilingual dictionary for the source language to the target language based on said source language annotation and a bilingual dictionary for the intermediate language to the target language, and outputting the second translated text as translation results in the target language.

12. The method of processing data according to claim 11, wherein the annotations include further annotation data comprising at least one of word source annotation data, word modification annotation data, sentence scope annotation data, alternative interpretation annotation data and linguistic attribute annotation data and wherein the second translating step comprises translating by referencing the further annotation data to produce annotation translation results and translating without referencing the further annotation data to produce non-annotation translation results, and wherein both translation results are outputted in the second step.

13. The method of claim 11 wherein said acquiring and adding annotations obtained by the translation to the first translated text in the intermediate language comprises at least one of designating annotations for parts of a sentence and adding data to selected significant parts of a sentence.

14. The method of claim 11 wherein the second translating step outputs both a translation from the source language to the target language made based on the source language annotation and a translation from the intermediate language to the target language made without using the source language annotation as translation results.

15. The method of claim 11 further comprising receiving at least one of user modification and user selection input in response to output of translation results.

* * * * *